US008533624B2

(12) United States Patent
Chaudhri et al.

(10) Patent No.: US 8,533,624 B2
(45) Date of Patent: Sep. 10, 2013

(54) METHOD AND APPARATUS FOR DISPLAYING A WINDOW FOR A USER INTERFACE

(75) Inventors: Imran Chaudhri, San Francisco, CA (US); Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 544 days.

(21) Appl. No.: 11/635,833

(22) Filed: Dec. 8, 2006

(65) Prior Publication Data

US 2007/0083825 A1    Apr. 12, 2007

Related U.S. Application Data

(63) Continuation of application No. 10/193,573, filed on Jul. 10, 2002, now Pat. No. 7,343,566.

(51) Int. Cl.
*G06F 3/048* (2013.01)

(52) U.S. Cl.
USPC ............ 715/781; 715/768; 715/788; 719/318

(58) Field of Classification Search
USPC .......... 715/781–809, 766–768, 814; 719/318
See application file for complete search history.

(56) References Cited

U.S. PATENT DOCUMENTS

| 4,555,775 A | 11/1985 | Pike |
| 4,890,098 A | 12/1989 | Dawes et al. |
| 5,191,620 A * | 3/1993 | Lee ............................... 381/105 |
| 5,265,202 A | 11/1993 | Krueger et al. |
| 5,333,272 A | 7/1994 | Capek et al. |
| 5,363,475 A | 11/1994 | Baker et al. |
| 5,425,141 A | 6/1995 | Gedye |
| 5,463,728 A | 10/1995 | Blahut et al. |
| 5,487,143 A | 1/1996 | Southgate |

(Continued)

FOREIGN PATENT DOCUMENTS

| EP | 1022650 | 7/2000 |
| JP | 2000152112 | 11/1998 |
| WO | 01/69387 | 9/2001 |

OTHER PUBLICATIONS

*Apple Inc* vs. *Samsung Electronic*, "Samsung's Patent Local Rule 3-3 and 3-4 Disclosures", Case No. 11-cv-01846-LHK, Oct. 7, 2011.

(Continued)

*Primary Examiner* — Tadeese Hailu
(74) *Attorney, Agent, or Firm* — Kilpatrick Townsend & Stockton LLP

(57) ABSTRACT

Methods and apparatuses to display windows. In more than one embodiments of the invention, a window is closed automatically (e.g., after a timer expires, or when a condition or criterion is met, or a system input is received) without user input. In some examples, the window is translucent so that the portion of another window, when present, is visible under the window. In some examples, the image of the window is faded out before the window is closed and destroyed. In some examples, the window does not close in response to any input from a user input device. In some examples, the window is repositioned (or hidden) automatically when another translucent window is displayed. The degree of translucency, the speed for fading out, the discrete levels of translucency for fading out, the time to expire, and/or other parameters for controlling the display of the window may be set by the user or adjusted by the system (or application software programs) automatically according to system conditions or other criteria.

11 Claims, 21 Drawing Sheets

(56) References Cited

U.S. PATENT DOCUMENTS

| | | | |
|---|---|---|---|
| 5,577,188 A | 11/1996 | Zhu | |
| 5,588,105 A | 12/1996 | Foster et al. | |
| 5,590,265 A | 12/1996 | Nakazawa | |
| 5,594,467 A | 1/1997 | Marlton | |
| 5,638,501 A | 6/1997 | Gough et al. | |
| 5,651,107 A | 7/1997 | Frank et al. | |
| 5,657,221 A * | 8/1997 | Warman et al. | 700/83 |
| 5,678,015 A | 10/1997 | Goh | |
| 5,694,150 A | 12/1997 | Sigona et al. | |
| 5,737,507 A | 4/1998 | Smith | |
| 5,764,229 A | 6/1998 | Bennett | |
| 5,798,752 A | 8/1998 | Buxton et al. | |
| 5,822,123 A | 10/1998 | Davis et al. | |
| 5,831,615 A | 11/1998 | Drews et al. | |
| 5,838,318 A | 11/1998 | Porter et al. | |
| 5,859,639 A | 1/1999 | Ebrahim | |
| 5,892,511 A | 4/1999 | Gelsinger et al. | |
| 5,929,854 A | 7/1999 | Ross | |
| 5,936,610 A | 8/1999 | Endo | |
| 5,940,517 A * | 8/1999 | Shinada et al. | 381/58 |
| 5,973,665 A * | 10/1999 | Davie et al. | 715/821 |
| 5,986,639 A | 11/1999 | Ozawa | |
| 5,999,191 A | 12/1999 | Frank et al. | |
| 6,008,809 A | 12/1999 | Brooks | |
| 6,031,529 A | 2/2000 | Migos et al. | |
| 6,061,064 A | 5/2000 | Reichlen | |
| 6,072,489 A | 6/2000 | Gough et al. | |
| 6,088,018 A | 7/2000 | DeLeeuw et al. | |
| 6,118,427 A | 9/2000 | Buxton et al. | |
| 6,147,684 A | 11/2000 | Nielson et al. | |
| 6,151,030 A | 11/2000 | DeLeeuw et al. | |
| 6,163,318 A | 12/2000 | Fukuda et al. | |
| 6,222,538 B1 | 4/2001 | Anderson | |
| 6,246,407 B1 | 6/2001 | Wilks et al. | |
| 6,249,826 B1 | 6/2001 | Parry et al. | |
| 6,252,595 B1 | 6/2001 | Birmingham et al. | |
| 6,292,204 B1 | 9/2001 | Carleton et al. | |
| 6,307,545 B1 | 10/2001 | Conrad et al. | |
| 6,336,131 B1 | 1/2002 | Wolfe | |
| 6,342,908 B1 * | 1/2002 | Bates et al. | 715/798 |
| 6,353,450 B1 | 3/2002 | DeLeeuw | |
| 6,359,631 B2 | 3/2002 | DeLeeuw | |
| 6,374,277 B2 * | 4/2002 | Vong et al. | 708/112 |
| 6,409,603 B1 | 6/2002 | Nishino et al. | |
| 6,429,883 B1 | 8/2002 | Plow et al. | |
| 6,433,798 B1 | 8/2002 | Smith et al. | |
| 6,509,911 B1 * | 1/2003 | Shimotono | 715/761 |
| 6,549,218 B1 | 4/2003 | Gershony et al. | |
| 6,577,350 B1 | 6/2003 | Proehl et al. | |
| 6,587,128 B2 | 7/2003 | Kanevsky et al. | |
| 6,600,500 B1 | 7/2003 | Yamamoto | |
| 6,654,036 B1 | 11/2003 | Jones | |
| 6,661,426 B1 | 12/2003 | Jetha et al. | |
| 6,670,970 B1 * | 12/2003 | Bonura et al. | 715/768 |
| 6,678,866 B1 * | 1/2004 | Sugimoto et al. | 715/203 |
| 6,694,486 B2 | 2/2004 | Frank et al. | |
| 6,720,982 B1 * | 4/2004 | Sakaguchi | 715/768 |
| 6,828,989 B2 | 12/2004 | Cortright | |
| 6,874,126 B1 | 3/2005 | Lapidous | |
| 6,876,369 B2 | 4/2005 | Brown et al. | |
| 6,907,447 B1 * | 6/2005 | Cooperman et al. | 709/203 |
| 6,996,783 B2 | 2/2006 | Brown et al. | |
| 7,046,254 B2 | 5/2006 | Brown et al. | |
| 7,068,266 B1 | 6/2006 | Ruelle | |
| 7,138,983 B2 | 11/2006 | Wakai et al. | |
| 7,155,729 B1 * | 12/2006 | Andrew et al. | 719/318 |
| 7,249,326 B2 | 7/2007 | Stoakley et al. | |
| 7,260,610 B2 * | 8/2007 | Grooters et al. | 709/207 |
| 7,286,141 B2 | 10/2007 | Rieffel et al. | |
| 7,287,063 B2 * | 10/2007 | Baldwin et al. | 709/216 |
| 7,305,441 B2 * | 12/2007 | Mathewson et al. | 709/206 |
| 7,342,594 B1 | 3/2008 | Ort et al. | |
| 7,417,650 B1 * | 8/2008 | Horvitz | 715/765 |
| RE41,922 E | 11/2010 | Gough et al. | |
| 2001/0004746 A1 | 6/2001 | Wright | |
| 2001/0028368 A1 | 10/2001 | Swartz et al. | |
| 2001/0040584 A1 | 11/2001 | DeLeeuw | |
| 2002/0042819 A1 | 4/2002 | Reichert et al. | |
| 2002/0047859 A1 | 4/2002 | Szlam et al. | |
| 2002/0094868 A1 | 7/2002 | Tuck et al. | |
| 2002/0143630 A1 | 10/2002 | Steinman et al. | |
| 2002/0191028 A1 | 12/2002 | Senechalle et al. | |
| 2003/0001899 A1 | 1/2003 | Partanen et al. | |
| 2003/0016253 A1 | 1/2003 | Aoki et al. | |
| 2003/0043197 A1 | 3/2003 | Kremer et al. | |
| 2003/0051228 A1 | 3/2003 | Martinez et al. | |
| 2003/0145060 A1 | 7/2003 | Martin | |
| 2003/0229722 A1 * | 12/2003 | Beyda | 709/310 |
| 2004/0001101 A1 | 1/2004 | Trajkovic | |
| 2004/0098462 A1 * | 5/2004 | Horvitz et al. | 709/207 |
| 2004/0204886 A1 | 10/2004 | Rieger et al. | |
| 2005/0235210 A1 | 10/2005 | Peskin et al. | |

OTHER PUBLICATIONS

ATI, "Multimedia Center 7.1 User Guide, Version 6.0", 2000.

ATI Technologies Inc., "ATI Multimedia Center", System, Offered before Jul. 10, 2002.

Bier, Eric, "Toolglass and Magic Lenses: The See-Through Interface", 1993.

Buckner, Richard, "Multiple Windows and Task Complexity Effects Upon Human-Computer Interface Viewability and Productivity", 1992.

Electronic Arts, "Crusader: No Remorse and Crusader: No Regret", System, Offered before Jul. 10, 2002.

IBM THINKPAD, System.

Kamba, T, "Using Small Screen Space More Efficiently", 1996.

Kurtenbach, G, "The Design of a GUI Paradigm based on Tablets, Two-Hands, and Transparency", Mar. 1997.

Lieberman, H, "Powers of Ten Thousand: Navigating in Large Information Spaces", Nov. 1994.

Miah, T, "Vanishing Windows—A Technique for Adaptive Window Management", Jan. 17, 2000.

Micron, "Micron Computers", System, Offered before Jul. 10, 2002.

Micron Electronics Inc, "TransPort LT User's Guide", Jan. 20, 2000.

Microsoft, et al., "Windows XP and Computers with Windows XP", System, Offered before Jul. 10, 2002.

MP2000, System.

Nokia Communicator, System.

Norman, Kent, "Cognitive Layouts of Windows and Multiple Screens for User Interface", May 20, 1986.

Palmpilot, System.

Rockstar Games, "Grand Theft Auto III", System, Offered before Jul. 10, 2002.

Samsung, "Additional Prior Art Relevant to the Invalidity of the '891 Patent Exhibit N", U.S. Patent No. 7,853,891, 3 pages.

Samsung, "Samsung's Invalidity Claim Chart for Bongwon Suh et al.,Popout Prism: Adding Perceptual Principles to Overview + Detail Document Interfaces, Proceedings of the Sigchi Conference on Human Factors in Computing Systems, Association for Computing Machinery", Exhibit M-8, U.S. Patent No. 7,853,891, 19 pages.

Samsung, "Samsung's Invalidity Claim Charts for ATI Multimedia. Center 7.1 ("ATI") Exhibit M-10", U.S. Patent No. 7,853,891, 16 pages.

Samsung, "Samsung's Invalidity Claim Charts for Crusader: No Remorse and Crusader: No Regret ("Crusader") Exhibit M-11", U.S. Patent No. 7,853,891, 17 pages.

Samsung, "Samsung's Invalidity Claim Charts for EP 1 022 650 Exhibit M-6", U.S. Patent No. 7,853,891, 15 pages.

Samsung, "Samsung's Invalidity Claim Charts for Grand Theft Auto III ("GTA3") Exhibit M-12", U.S. Patent No. 7,853,891, 23 pages.

Samsung, "Samsung's Invalidity Claim Charts for Micron Computers, Including Micron Transport Lt, Commercially Sold, Publicly Known, or Publicly Used Before Jul. 10, 2002 ("Micron Computers") Exhibit M-13", U.S. Patent No. 7,853,891, 13 pages.

Samsung, "Samsung's Invalidity Claim Charts for Micron Transport Lt User's Guide ("Micron") Exhibit M-9", U.S. Patent No. 7,853,891, 16 pages.

Samsung, "Samsung's Invalidity Claim Charts for Sony Computer Displays, Including Sony Trinitron, and Computers With Sony Computer Displays Commercially Sold, Publicly Known, or Publicly Used Before Jul. 10, 2002 ("Sony Trinitron") Exhibit M-14", U.S. Patent No. 7,853,891, 19 pages.

Samsung, "Samsung's Invalidity Claim Charts for U.S Patent No. 6,907,447 Exhibit M-1", U.S. Patent No. 7,853,891, 16 pages.

Samsung, "Samsung's Invalidity Claim Charts for U.S Patent No. 7,155,729 Exhibit M-2", U.S. Patent No. 7,853,891, 13 pages.

Samsung, "Samsung's Invalidity Claim Charts for U.S Patent No. 7,249,326 Exhibit M-3", U.S. Patent No. 7,853,891, 13 pages.

Samsung, "Samsung's Invalidity Claim Charts for U.S Patent No. 7,417,650 Exhibit M-4", U.S. Patent No. 7,853,891, 12 pages.

Samsung, "Samsung's Invalidity Claim Charts for U.S Publication No. 2002/0143630 Exhibit M-5", U.S. Patent No. 7,853,891, 15 pages.

Samsung, "Samsung's Invalidity Claim Charts for U.S. Patent Application No. 2003/0016253 ("Aoki")", and Cooperman '447, Andrew '729, Stoakley '326, Horvitz '650, Steinman '630, Sakaguchi '650, Suh, Micron, ATI, Crusader, GTA3, Micron Computers, Sony Trinitron, Windows XP, and U.S. Patent Application No. 2003/0051228 ("Martinez") Exhibit O-1, U.S. Patent No. 7,853,891, 25 pages.

Samsung, "Samsung's Invalidity Claim Charts for Windows XP and Computers With Windows XP Commercially Sold, Publicly Known, or Publicly Used Before Jul. 10, 2002 ("Windows XP") Exhibit M-15", U.S. Patent No. 7,853,891, 13 pages.

Samsung, "Samsung's Invalidity Claim Charts for WO 01/69387 Exhibit M-7", U.S. Patent No. 7,853,891, 13 pages.

Sony, "Sony Computer Displays, Including Sony Trinitron, and Computers with Sony Computer Displays", System, Offered before Jul. 10, 2002.

Suh, et al., "Popout Prism: Adding Perceptual Principles to Overview + Detail Document Interfaces", Apr. 2002.

Toshiba TECRA, System.

Zanella, A, "Avoiding Interference Through Translucent Interface Components in Single Display Groupware", Mar. 2001.

Zhai, S, "The Partial-Occlusion Effect: Utilizing Semitransparency in 3D Human-Computer Interaction", 1996.

Office Action for U.S. Appl. No. 13/635,847, mailed on Dec. 8, 2011, 9 pages.

Re-issue U.S. Appl. No. 12/437,500, filed May 7, 2009, to Gough et al., titled Method and Apparatus for Providing Translucent Images on a Computer Display.

Notice of Allowance for U.S. Appl. No. 11/635,847, mailed Jul. 24, 2013, 26 pages.

* cited by examiner ered a # METHOD AND APPARATUS FOR DISPLAYING A WINDOW FOR A USER INTERFACE This application is a continuation of U.S. patent application Ser. No. 10/193,573, filed on Jul. 10, 2002 now U.S. Pat. No. 7,343,566.

FIELD OF THE INVENTION

The invention relates to graphical user interfaces, and more particularly to such interfaces with windows.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright Apple Computer, Inc., 2002

BACKGROUND OF THE INVENTION

Many digital processing systems use window-based graphical user interfaces for users to interact with software programs. Images of windows are displayed on a display device to show the user the states of the software programs; and user input devices (e.g., a keyboard and a mouse) are used to accept user inputs. In addition to user input devices, a digital processing system may have other devices (e.g., sensors) for accepting system inputs, such as phone line status, power supply status, storage disk usage status, communication connection status, execution status of software programs, and others that are not directly related to user inputs (signals associated with user input devices).

FIGS. 2-6 illustrate examples of traditional windows. FIG. 2 shows a typical window 210 that has title bar 203 and buttons 205, 207 and 209 for minimizing, maximizing, and closing the window. The title bar and the buttons on the title bar can be used to manipulating the position and size of the window. For example, title bar 203 may be clicked (e.g., pressing a button of a mouse while the cursor is on the title bar) to bring the window to the top level of the window displaying hierarchy so that if there are any other windows displayed at the same location of window 210, these windows will be hidden under window 210.

When a user starts an application program, a window (e.g., window 201) may be displayed to show the license/copyright information while the components of the software program are being loaded. After the components of the software program are fully loaded, the license/copyright window is closed automatically so that the user can start to use the software program without interference from the license/copyright window.

FIG. 3 shows task bar 211 with flash help window 213. When the user pauses cursor 215 at a location of the task bar for a short period of time, flash help window 213 appears. If the user does not move the cursor for another short period of time while window 213 is displayed, flash window 213, disappears. If the user moves cursor 215 slightly (e.g., using a mouse, a track ball, or a touch pad) and pauses the cursor 215 again, flash help window may appear again.

FIGS. 4-6 show a window that displays the progress of copying a file. When a file is copied from one location to another location, window 221 is displayed to indicate the progress. Button 227 is provided for canceling the copy operation; and button 225 is for closing the progress window. The progress of the operation is indicated by progress bar 229 and an animation showing that the document is going from one folder to another. Windows 221 and 231 in FIGS. 4 and 5 show two snap shots of the animation. A user may drag title bar 223 (e.g., pressing down and holding a button of a mouse and moving the mouse while holding down the button) to drag the window from one location on a screen to another; and the user can click on the title bar to bring the window to the top level when the window is partially covered by another window (e.g., when window 241 is partially covered by window 243, as shown in FIG. 6). When the copy operation completes, the progress window closes automatically.

Traditional windows typically provide strong user interactions, which may cause distractions. For example, a user waits for window 201 to disappear to view window 210 in FIG. 2; the user manipulates a cursor control device (e.g., a mouse, a track ball, or a touch pad) to view or dismiss flash help window 213 in FIG. 3; and, the user interaction is provided to relocate the progress window or change the window displaying hierarchy to see the progress of window 241 in FIG. 6.

SUMMARY OF THE INVENTION

Methods and apparatuses to display windows are described here. There are many different embodiments which are described here. Some of these embodiments are summarized in this section.

In more than one embodiment of the invention, a window is closed automatically (e.g., after a timer expires, or when a condition or criterion is met, or system input is received) without user input. In some examples, the window is translucent so that the portion of another window, when present, is visible under the window. In some examples, the image of the window is faded out before the window is closed and destroyed. In a further example, the level of translucency, the speed for fading out, the discrete levels of translucency for fading out, the time to expire, and/or other parameters for controlling the display of the window may be set by the user or adjusted by the system (or application software programs) automatically according to system conditions or other criteria.

In one embodiment of the invention, a method to display a user interface window for a digital processing system includes: displaying a first window in response to receiving a first input from a user input device (e.g., a keyboard, mouse, track ball, touch pad, touch screen, joy stick, button, or others) of the digital processing system which is capable of displaying at least a portion of a second window under the first window; starting a timer; and closing the first window in response to a determination that the timer expired. The first window does not close in response to any input from a user input device of the digital processing system. In one example according to this embodiment, the first window is translucent; the portion of the second window is visible while under the first window; and the first window is at a top level in a window displaying hierarchy. In one example, an image of the first window is faded out on the screen before the first window is destroyed to close the first window. In one example, the second window, if displayed, closes in response to an input from a user input device of the digital processing system; and the first window does not respond to any input from a user input device of the digital processing system. In one example, the first window is repositioned in response to a third window (e.g., an alert window or a translucent window) being displayed; in another example, the first window is hidden in response to a third window being displayed at a location where the first window is displayed. In one example, the first window is repositioned on a display in response to a second input for the first window (e.g., an input indicating that a third window is displayed, or an input from a user input device of the digital processing system to reposition the window, such as dragging and dropping the window); and a position of the first window in a window displaying hierarchy can be adjusted in response to a third input (e.g., bringing another window in front of the first window). In one example, the first window is displayed at a position on a display of the digital processing system that is independent of a position of a cursor on the display (e.g., a position centered horizontally on the display); and the timer is restarted in response to receiving a second input for the first window (e.g., from a user input device of the digital processing system).

In another embodiment of the invention, a method to display a user interface window for a digital processing system includes: displaying a first translucent window such that if a portion of a second window is displayed on the digital processing system under the first window, the portion of the second window is visible under the first window; and closing the first window without user input. In one example according to this embodiment, a timer is started so that when the timer expires the first window is closed (e.g., fading out an image of the first window and destroy the first window). In another example, the first window is closed in response to an input that is not associated with a user input device of the digital processing system. In a further example, the first window is closed in response to a determination that a system condition is met (e.g., a system status is changed, or other criteria).

In a further embodiment of the invention, a method to display a user interface window for a digital processing system includes: displaying a first window in response to receiving a first input that is not associated with a user input device of the digital processing system; starting a timer; and closing the first window in response to a determination that the timer expired (e.g., fading out an image of the first window; and destroying the first window). In one example, the first window does not close in response to any input from a user input device of the digital processing system (e.g., the first window does not respond to any input from a user input device of the digital processing system); and the first window is translucent such that a portion of a second window is visible when displayed under the first window. In one example, the first window is repositioned on a display without user input (e.g., in response to a third window being displayed). In another example, the timer is restarted in response to receiving a second input for the first window; and the second input is received from a user input device of the digital processing system.

The present invention includes apparatuses which perform these methods, including data processing systems which perform these methods and computer readable media which when executed on data processing systems cause the systems to perform these methods.

Other features of the present invention will be apparent from the accompanying drawings and from the detailed description which follow.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention.

Many of the methods of the present invention may be performed with a digital processing system, such as a conventional, general purpose computer system. Special purpose computers which are designed or programmed to perform only one function may also be used.

Figure 1:
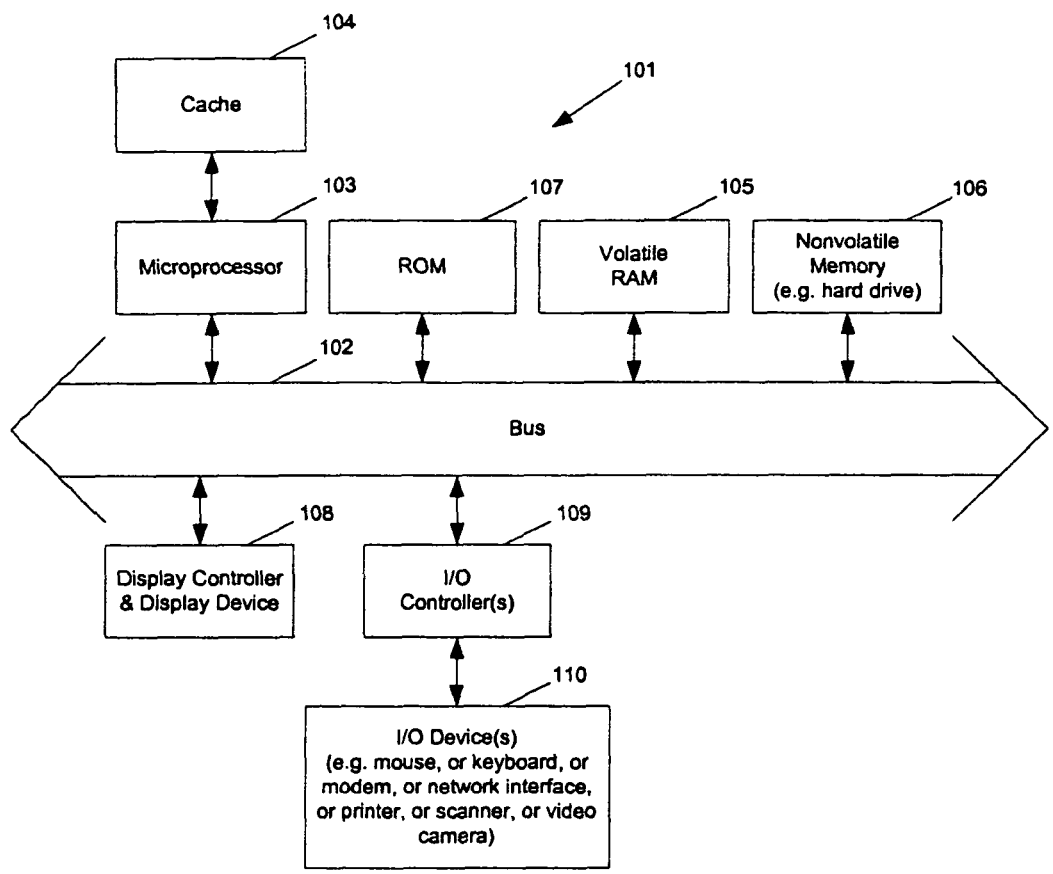
FIG. 1 shows a block diagram example of a data processing system which may be used with the present invention.
Figure 2:
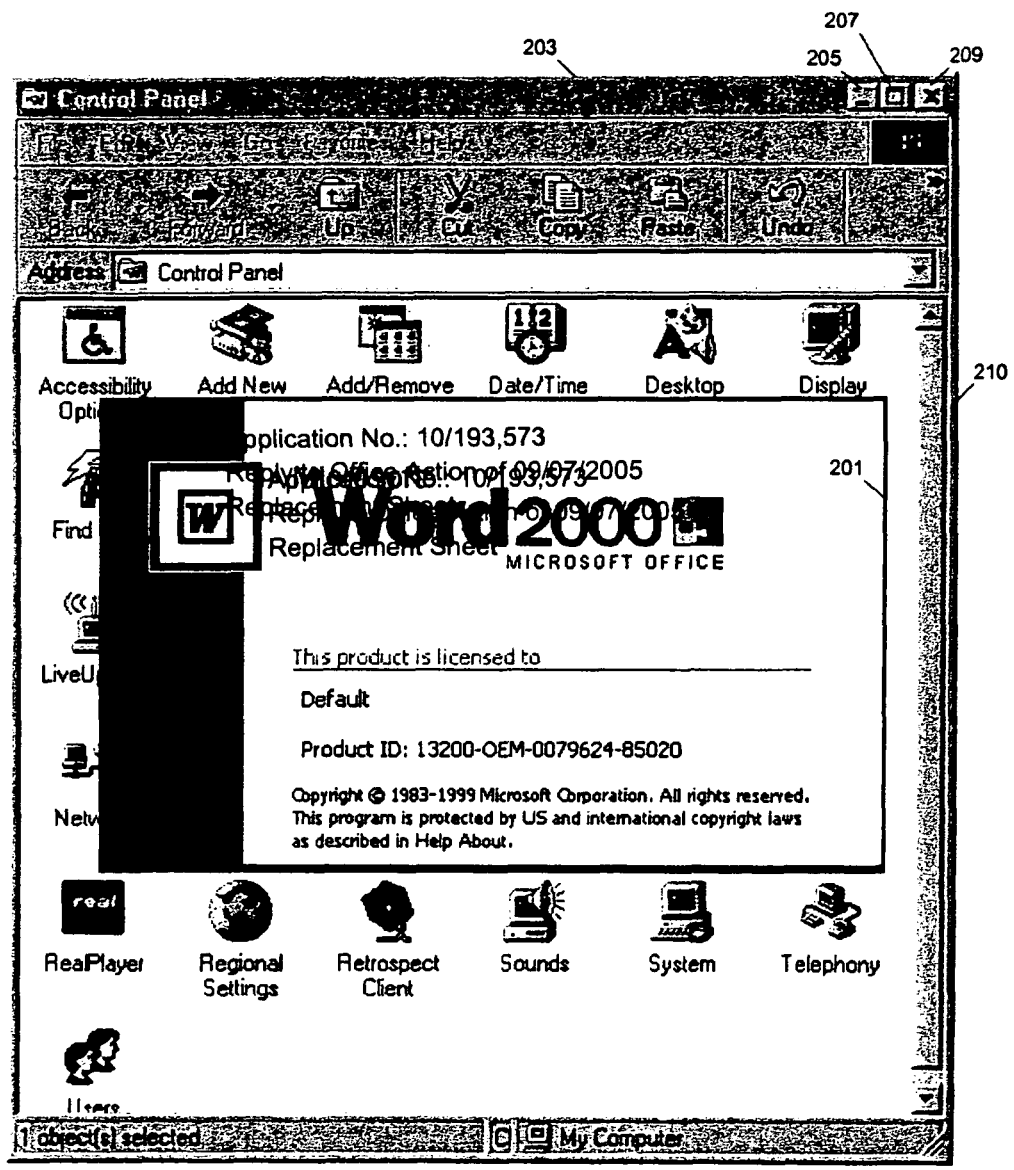
FIGS. 2-6 illustrate examples of traditional windows.
Figure 3:
Figure 4:
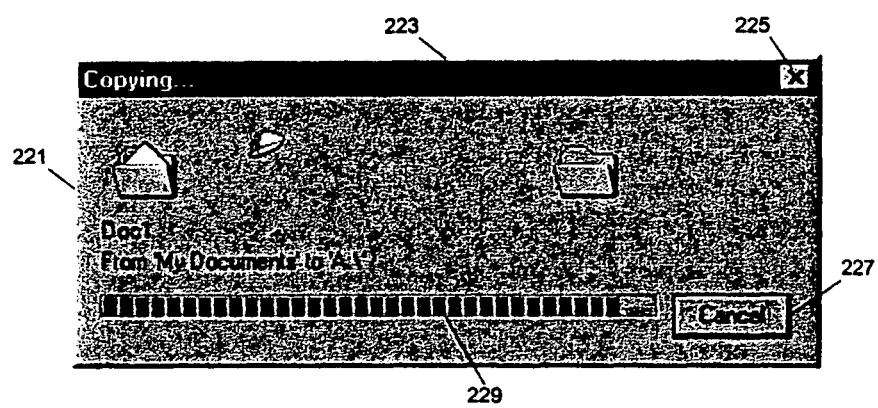
Figure 5:
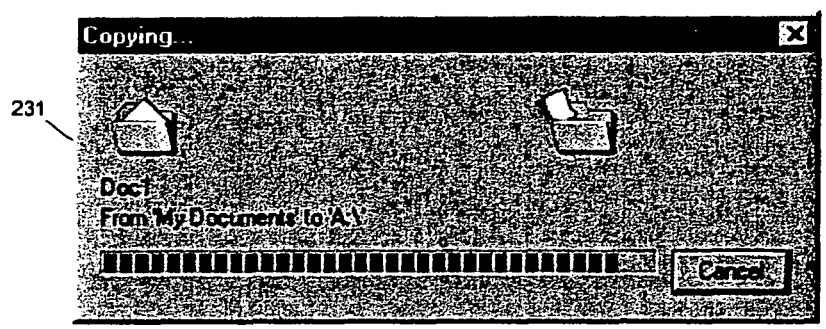
Figure 6:
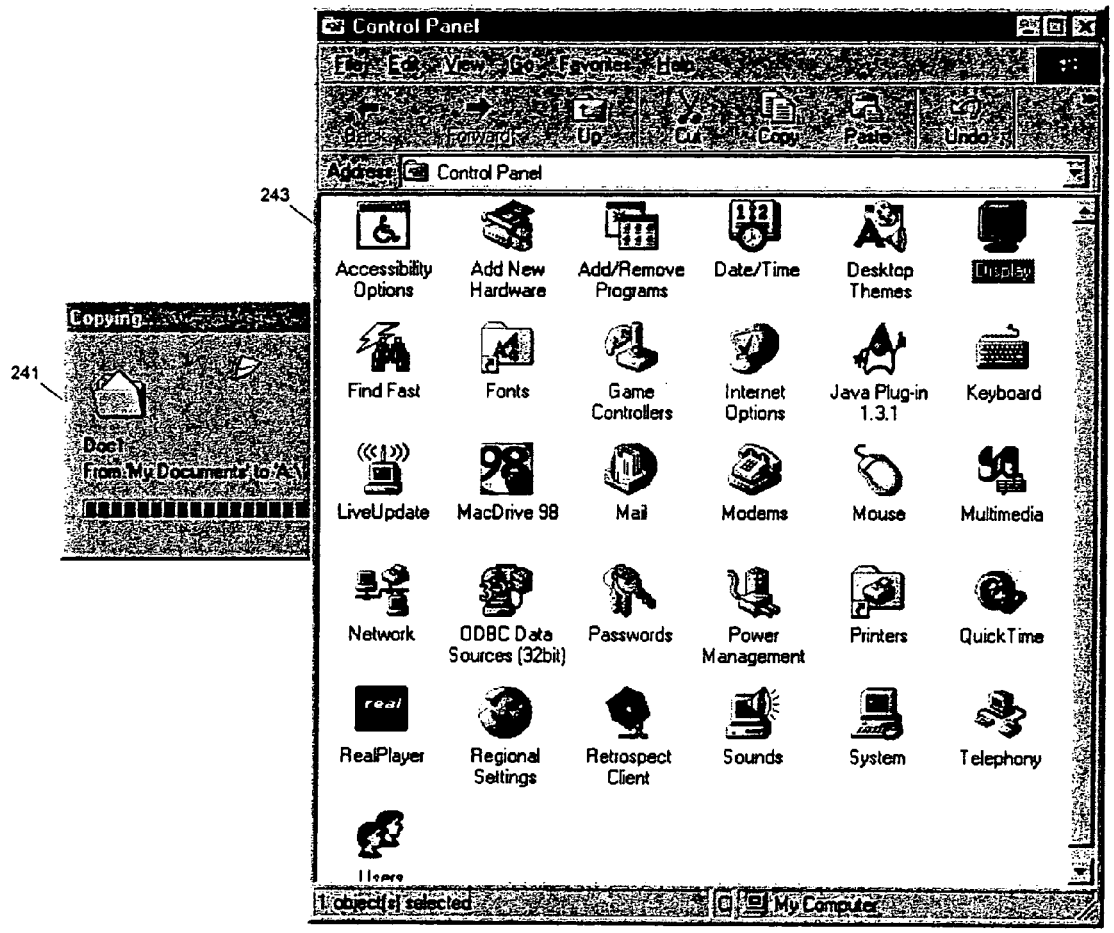

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable media can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable media includes any mechanism that provides (i.e., stores and/or transmits) information in a form accessible by a machine (e.g., a computer, network device, personal digital assistant, manufacturing tool, any device with a set of one or more processors, etc.). For example, a machine readable media includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

At least one embodiment of the present invention seeks to display a window with reduced distractions so that a user can focus on more important windows.

Figure 7:
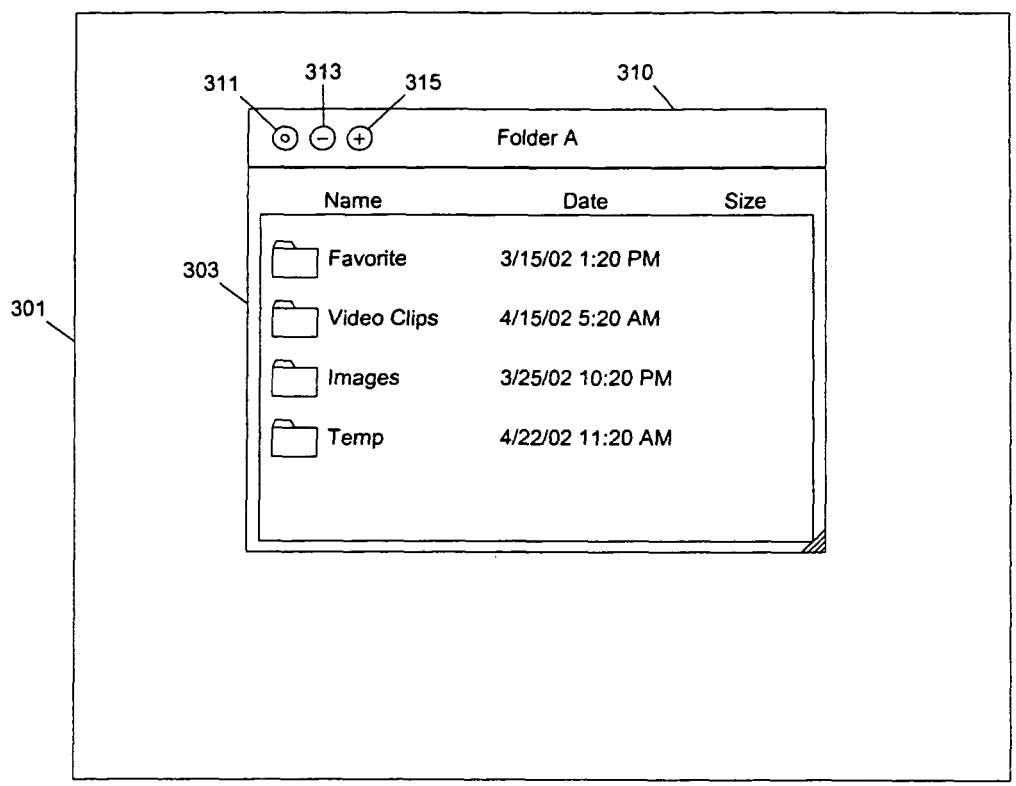
FIGS. 7-11 illustrate example scenarios of displaying a window according to one embodiment of the present invention.
Figure 8:
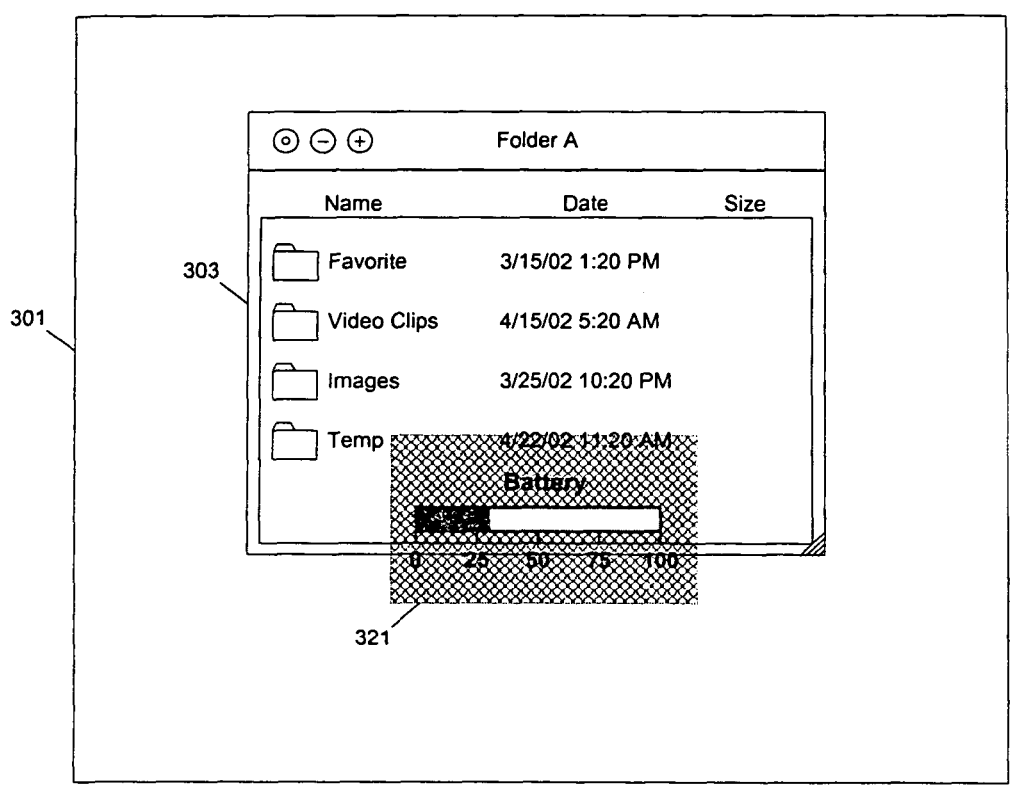

FIGS. 7-11 illustrate example scenarios of displaying a window according to one embodiment of the present invention. Traditional window 303 is shown in FIG. 7. Window 303 contains control buttons 311, 313 and 315 for closing, minimizing and maximizing the window. Window 303 also has title bar 310, which may be used to relocate the window on screen 301. Consider a scenario where the battery power of the system is lower than a threshold. After the system detects such a system status change, window 321 may be displayed near the center of screen 301, as shown in FIG. 8. Window 321 is translucent so that regular window 303 is still visible under window 321. Once window 321 is displayed on the screen, a timer is started to control the closing of the window. When the timer expires, window 321 is automatically closed without any user input. Thus, window 321 displays the message of low battery power to the user without forcing the user to provide inputs to dismiss the message window. Since window 321 is translucent and transient, the portion of window 303 that is under window 321 is still visible. Thus, the user can continue working with window 303 (or other window) without having to provide additional input to get message window 321 out of the way.

In one embodiment of the present invention, translucent window 321 is always displayed at the top level of the window displaying hierarchy so that the translucent window is always visible when displayed. This eliminates the need for the user to change the window displaying hierarchy to bring up the translucent window when another traditional window is brought up to the top of the window displaying hierarchy (e.g., by creating a new window or accidentally changing the hierarchy). In another embodiment of the present invention, the user can change the position of the translucent window in the hierarchy so that if the user desires the translucent window may be sent to a background position.

Figure 9:
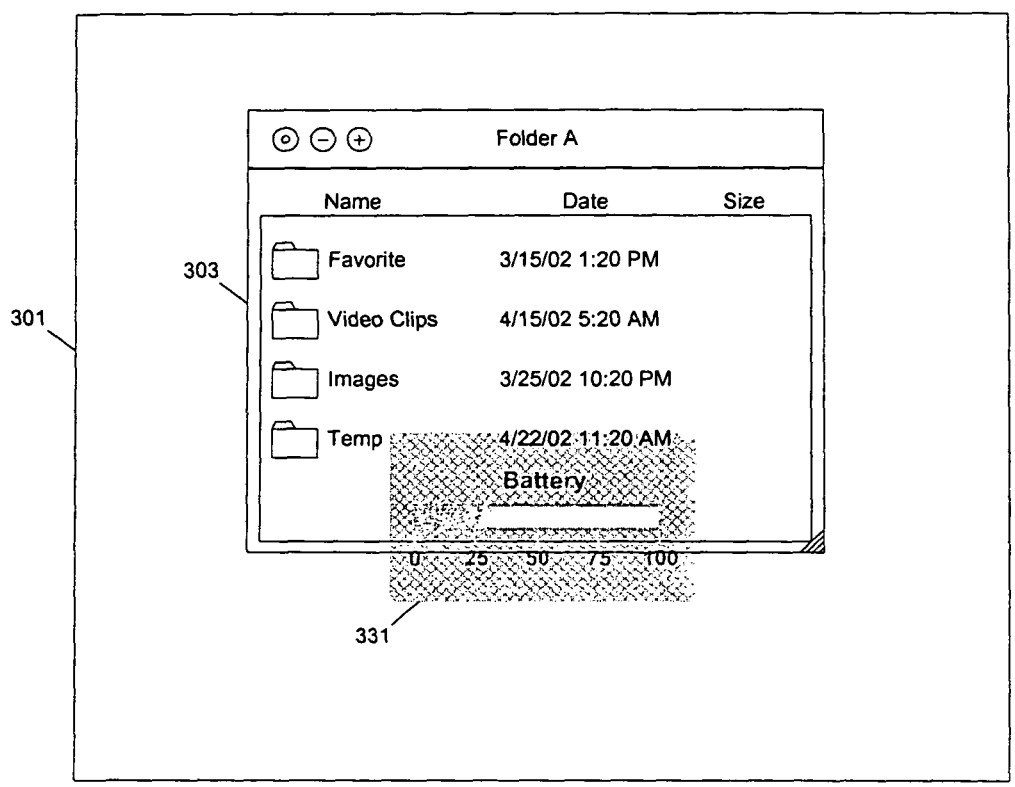
Figure 10:
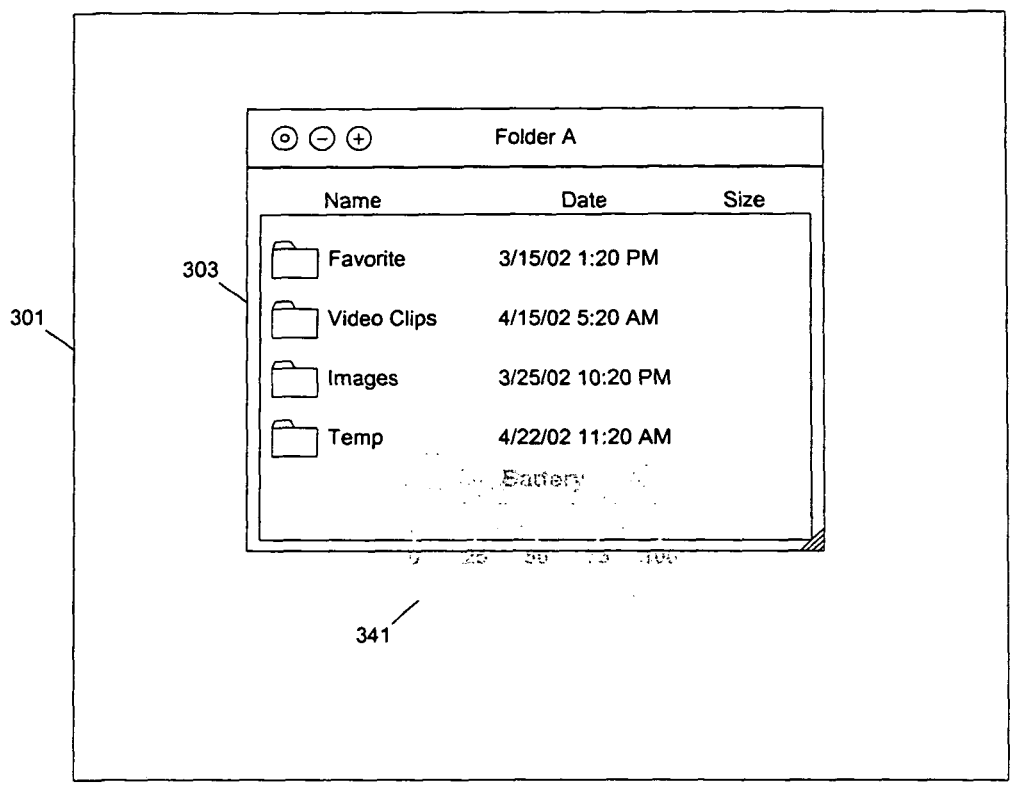

In one embodiment of the present invention, the image of window 321 is faded out when the timer expires, which is illustrated by the images of windows 321, 331, and 341 in FIGS. 8, 9 and 10. After the image of window 321 is faded out, window 321 is destroyed.

Figure 11:
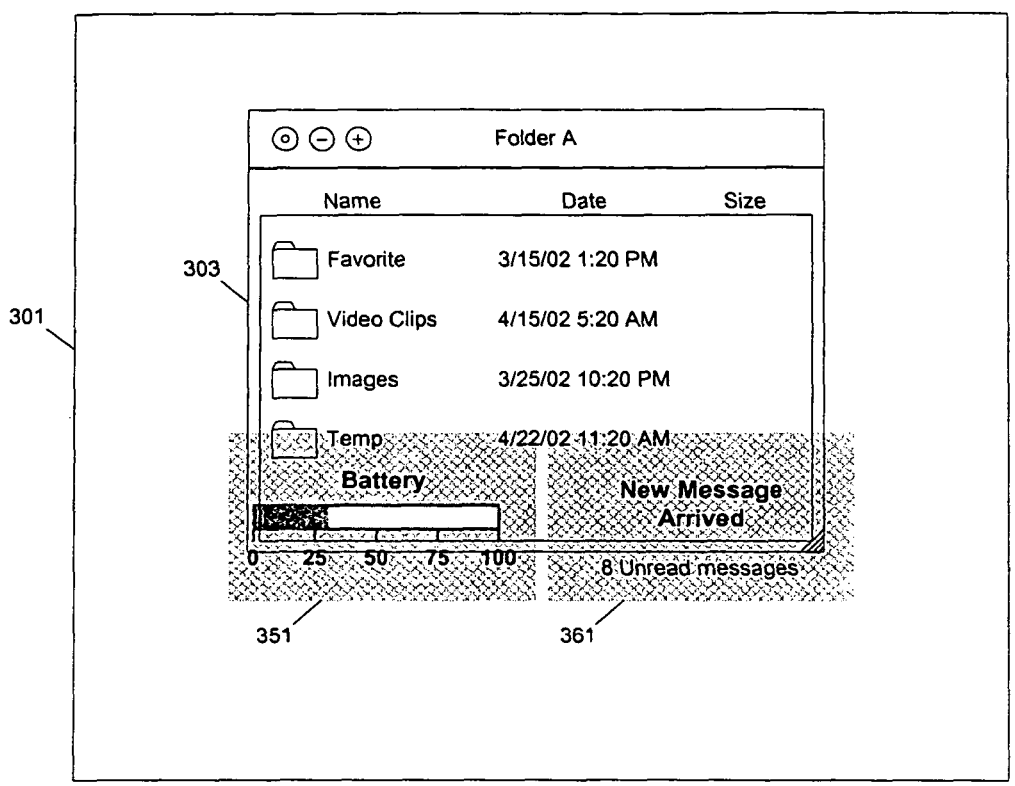

In another embodiment of the present invention, a translucent message window starts to fade out when a status change is detected. For example, a message window is displayed when the system detects the ringing signal on a phone line. When the system detects that the ringing signal is no longer present on the phone line, the image of the message window is faded out; and the message window is destroyed. Similarly, a translucent progress window for showing the progress of copying a file can be faded out and destroyed after the copy process ends. In one example, message window 361 as shown in FIG. 11 is displayed when a new message arrives. When the user starts to open an application to view the new message, message window 361 is closed automatically so that the user does not have to provide input to dismiss the message window or wait for the message window to fade out.

In one embodiment of the present invention, the image of window 321 gradually sets in when the window is first displayed. In another embodiment of the present invention, window 321 in FIG. 8 is automatically relocated or moved (e.g., in an animation fashion) to a different location so that the image of window 321 does not obscure the display of any particular portion of windows 303 for an extended period of timed. For example, window 321 may be automatically moved across the screen horizontally from the left hand side of screen 301 to the right hand side of screen 301 (or near the center of screen 321 in a circular motion).

In one embodiment of the present invention, the system detects (or manages) all the translucent windows so that when a second translucent window is displayed before the first translucent window is closed, the first translucent window is repositioned so that the second translucent window can be easily seen on the screen without interference with each other. For example, after battery low window 321 is displayed as in FIG. 8, the system may detect a new message arrived for the user. Thus, translucent window 361 is displayed as in FIG. 11 to inform the user about the new message. At the same time, window 351 is automatically moved to a position as seen in FIG. 11 so that both translucent windows 351 and 361 can be easily seen on the screen. Alternatively, the first translucent window (e.g., window 351) is hidden so that only the second window (e.g., window 361) is displayed. The timer of the first window is stopped while being hidden until the second window is automatically closed. In a further embodiment of the present invention, the window system tracks the translucent windows to automatically schedule the sequence and the screen positions of the display of the translucent windows according to the importance of the windows, the time to close (or estimated time to close), and/or other conditions.

FIGS. 8-11 show an example of translucent windows that are initiated by a system without any input associated with user input devices (e.g., a keyboard, mouse, track ball, touch pad, touch screen, joy stick, button, or other criteria). In one embodiment of the present invention, these translucent windows do not consume any user input; and no user input can be provided to these windows to close these windows, which close automatically when certain conditions are met (e.g., the expiration of a timer, the change in system status, and others). In one alternative embodiment of the present invention, these windows accept predetermined inputs (e.g., special function keys, such as the escape key "ESC" for closing) so that a user has the option to directly control the display of these translucent windows.

A user may initiate a translucent window through an input associated with a user input device. For example, a user may use a special function key to adjust volume (or contrast, or brightness). In response to the special function key, a translucent window is displayed to show the current volume level (or contrast, or brightness). In one embodiment of the present invention, the window system (or an application program) automatically determines a location for displaying the translucent volume window (e.g., independent from the location of a cursor on the screen). When the volume window receives an input from the function key for adjust volume, the timer for the translucent volume window is restarted. After the user stops adjusting the volume for a predetermined amount of time, the timer expires; and the volume control window is faded out and closed automatically. In one embodiment of the present invention, the volume window is not translucent. In one embodiment of the present invention, the translucent window initiated by an input associated with a user input device does not close in response to any input from a user input device (e.g., the window does not have a button for closing the window, nor takes a short cut key for closing the window); the window closes only automatically. When the window does not close in response to any input from a user input device, the window may still respond to system inputs, such as a request from the operating system to close the window (e.g., when the user starts to shut down a computer system). In one embodiment of the present invention, a message window initiated by a user only displays a message to the user without consuming any input from user input devices.

In one embodiment of the present invention, when a translucent window accepts user input, the translucent window consumes only predetermined inputs for user input devices; other inputs are forwarded to normal windows as if the translucent window does not exist. For example, if a cursor related event (e.g., a click) is not accepted by the translucent window, the input is considered for the window that is just under the translucent window so that the user can interact with the window under the translucent window as if the translucent window does not exist. If the translucent window does not consume a keyboard input, the keyboard input is forwarded to the window that has the keyboard focus (which is typically indicated by a highlighted title bar). Thus, the presence of the translucent window has minimum distractions for the user working on regular windows.

FIGS. 7-11 illustrate one embodiment of the present invention with translucent windows. It is apparent to one skilled in the art from this description that some methods of the present invention can be implemented for windows that are not translucent.

Figure 12:
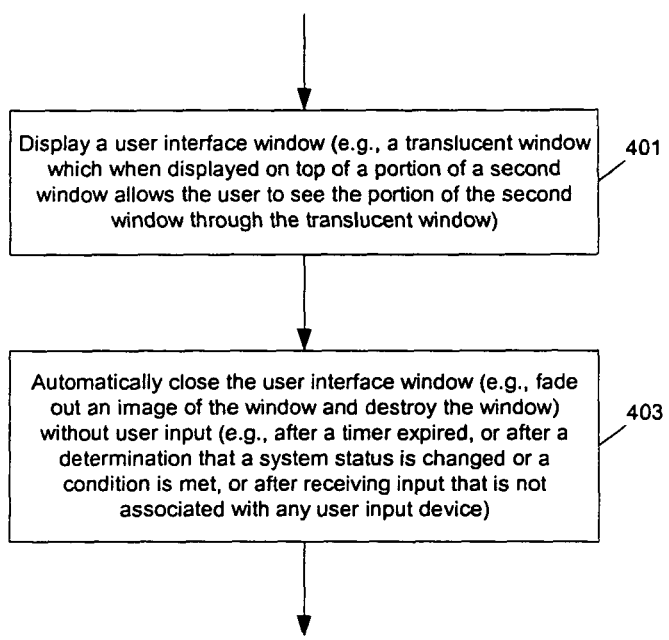
FIG. 12 shows a flow diagram of a method to display a window according to one embodiment of the present invention.

FIG. 12 shows a flow diagram of a method to display a window according to one embodiment of the present invention. Operation 401 displays a user interface window (e.g., a translucent window which when displayed on top of a portion of a second window allows the user to see the portion of the second window through the translucent window); and operation 403 automatically closes the user interface window (e.g., fade out an image of the window and destroy the window) without user input (e.g., after a timer expired, or after a determination that a system status is changed or a condition is met, or after receiving input that is not associated with any user input device).

Figure 13:
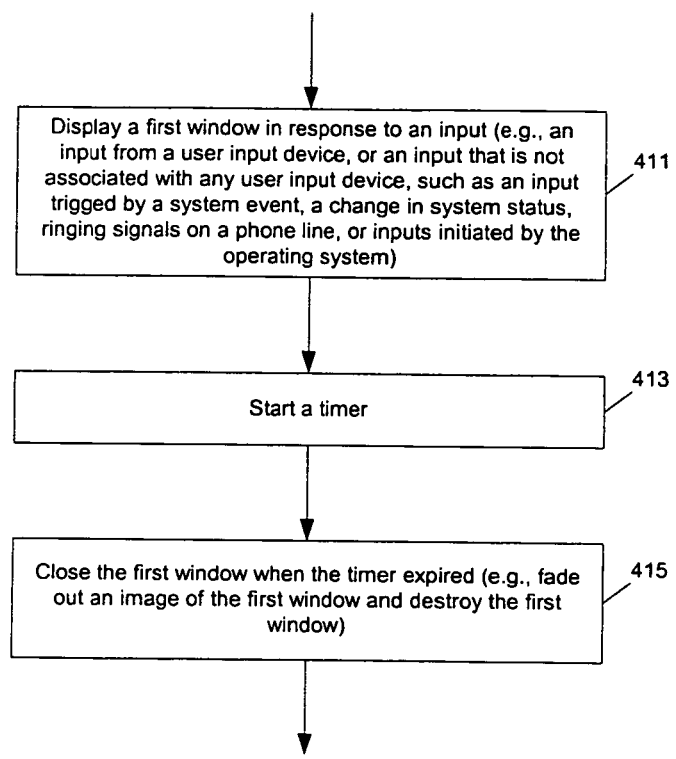
FIG. 13 shows a flow diagram of a method to close a window according to one embodiment of the present invention.

FIG. 13 shows a flow diagram of a method to close a window according to one embodiment of the present invention. Operation 411 displays a first window in response to an input (e.g., an input from a user input device, or an input that is not associated with any user input device, such as an input trigged by a system event, a change in system status, ringing signals on a phone line, or inputs initiated by the operating system). Operation 413 starts a timer. Operation 415 closes the first window when the timer expires (e.g., fade out an image of the first window and destroy the first window).

Figure 14:
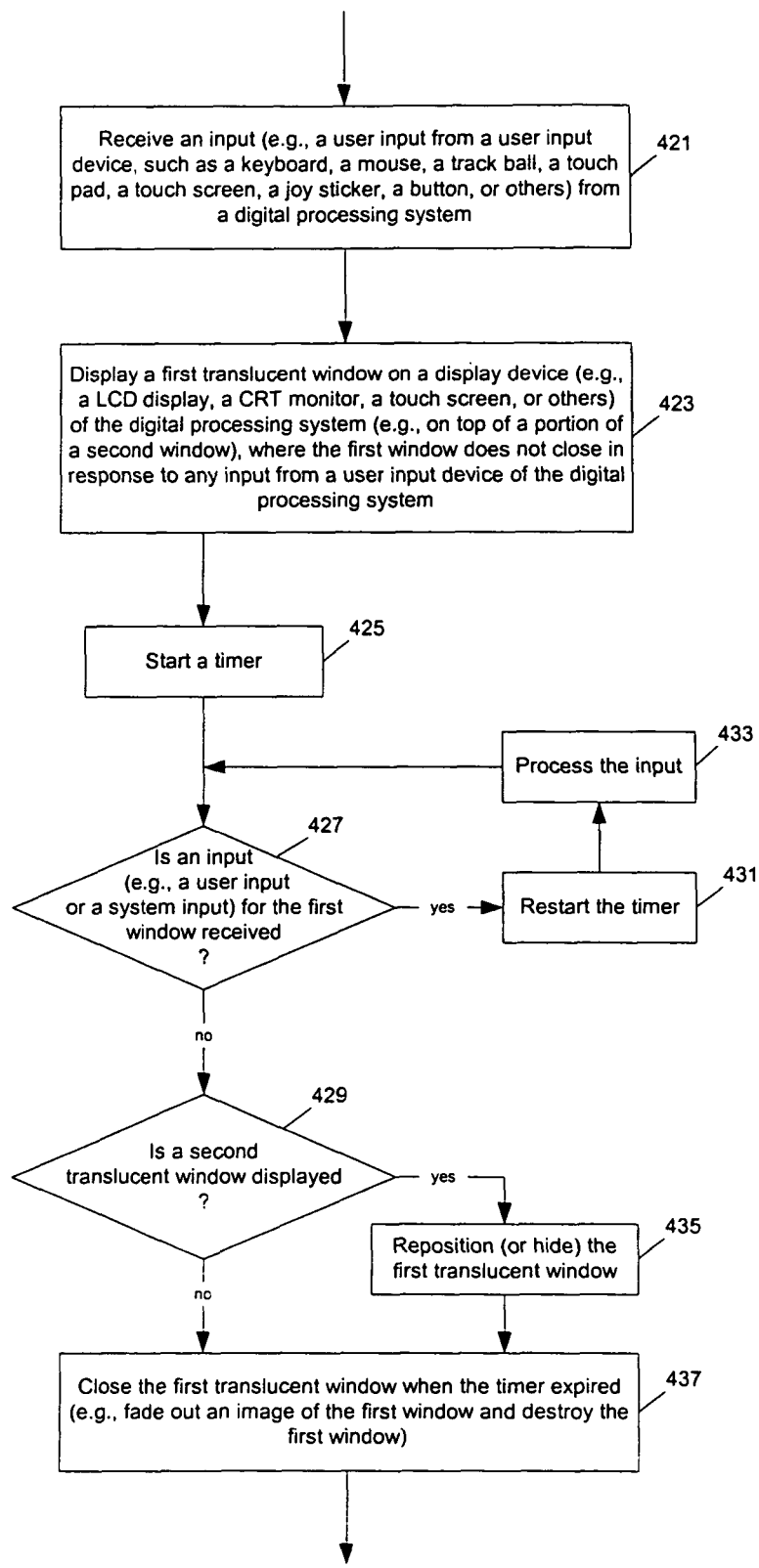
FIG. 14 shows a detailed flow diagram of a method to control a translucent window according to one embodiment of the present invention.

FIG. 14 shows a detailed flow diagram of a method to control a translucent window according to one embodiment of the present invention. After operation 421 receives an input (e.g., a user input from a user input device, such as a keyboard, a mouse, a track ball, a touch pad, a touch screen, a joy sticker, a button, or others) from a digital processing system, operation 423 displays a first translucent window on a display device (e.g., a LCD display, a CRT monitor, a touch screen, or others) of the digital processing system (e.g., on top of a portion of a second window), where the first window does not close in response to any input from a user input device of the digital processing system. Operation 425 starts a timer. When operation 427 determines that an input (e.g., a user input or a system input) for the first window is received, operation 431 restarts the timer; and operation 433 processes the input (alternatively, the timer may be stopped and restarted after the input is processed). When operation 429 determines that a second translucent window is displayed, operation 435 repositions (or hides) the first translucent window. When one of a number of translucent windows is closed, the remaining translucent window(s) may be repositioned (or displayed if hidden). Operation 437 closes the first translucent window when the timer expires (e.g., by fading out an image of the first window and destroying the first window).

Figure 15:
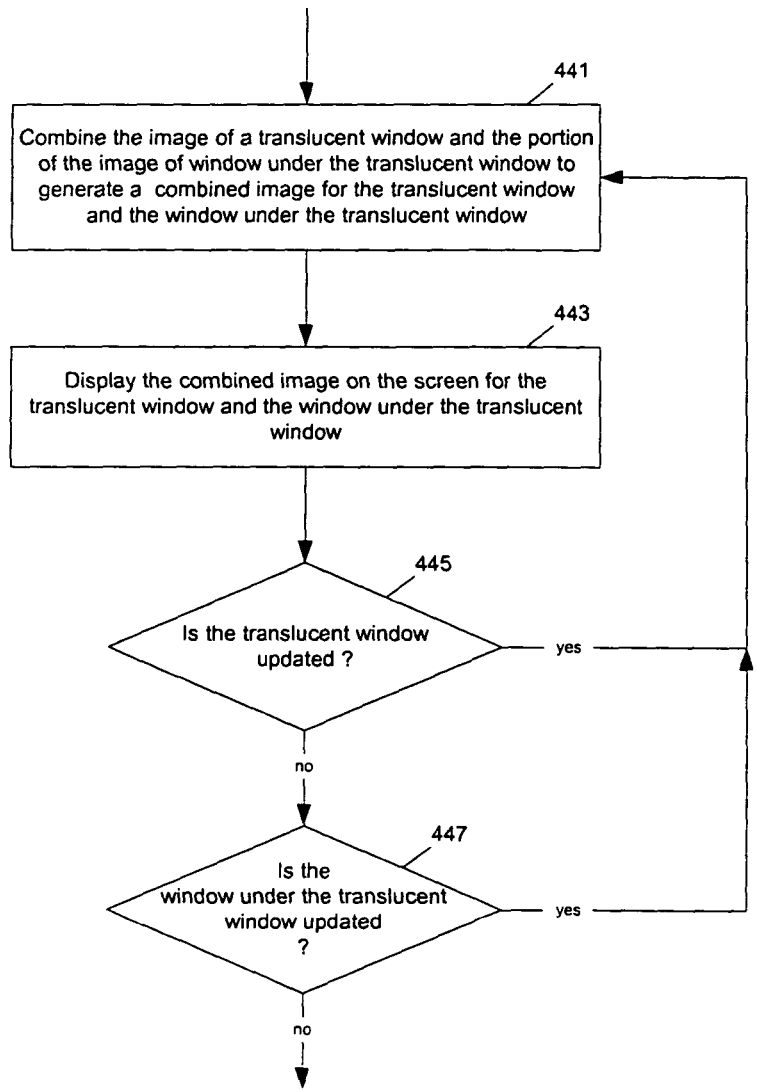
FIG. 15 shows a method to display a translucent window according to one embodiment of the present invention.
Figure 16:
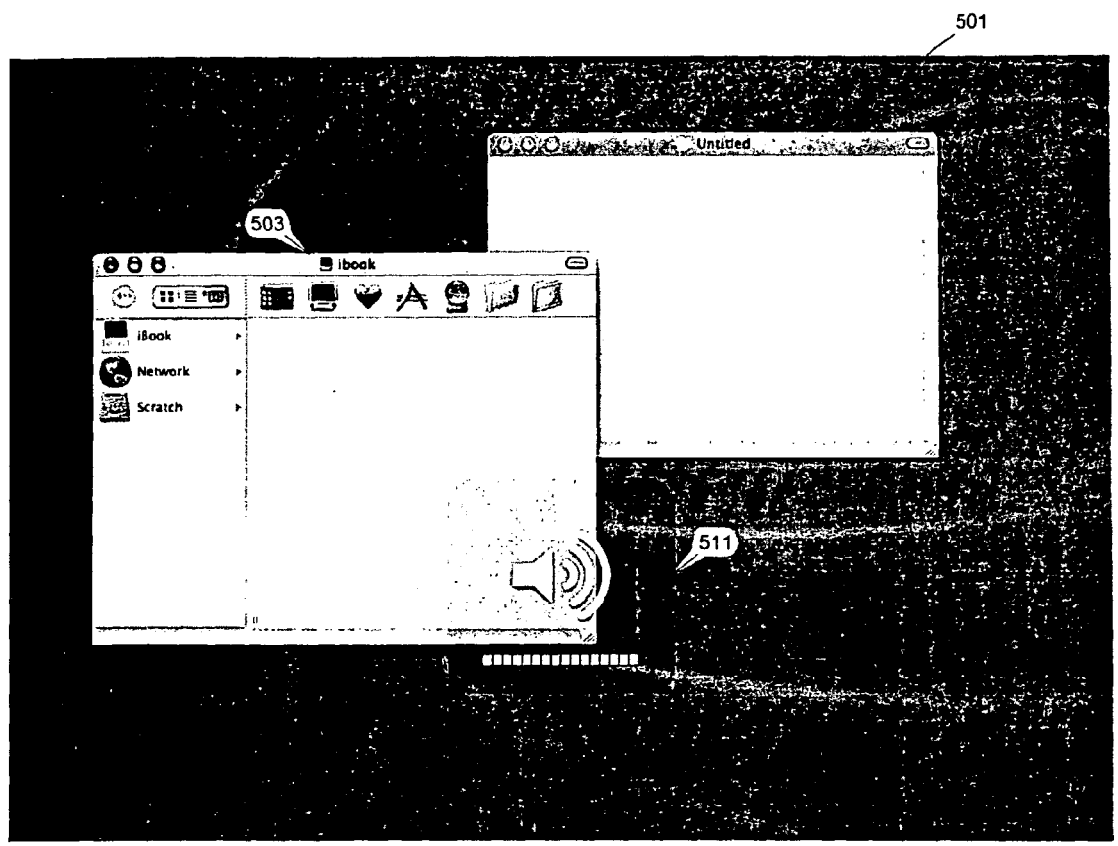
FIGS. 16-21 show example screen images of windows displayed according to one embodiment of the present invention.
Figure 17:
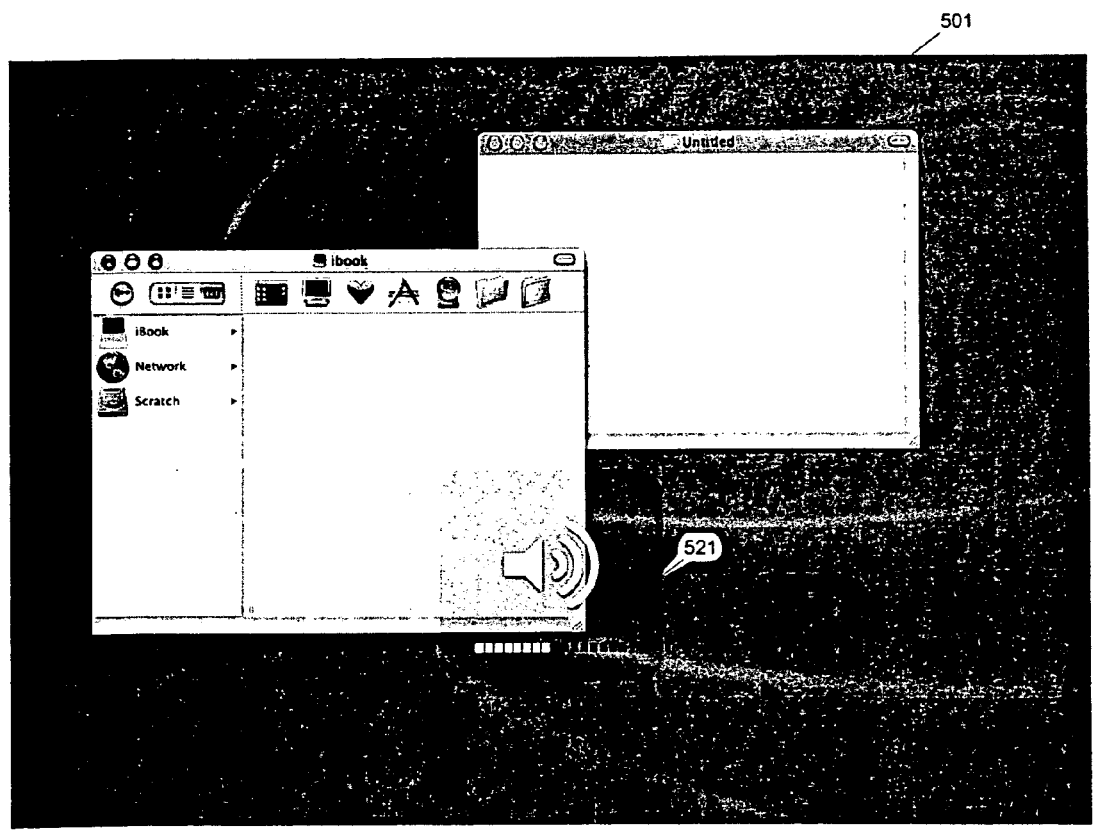

FIG. 15 shows a method to display a translucent window according to one embodiment of the present invention. Operation 441 combines the image of a translucent window and the portion of the image of window under the translucent window to generate a combined image for the translucent window and the window under the translucent window. Operation 443 displays the combined image on the screen for the translucent window and the window under the translucent window. If operation 445 determines that the translucent window is updated or operation 447 determines that the window under the translucent window is updated, operation 441 is performed to update the corresponding portion of the screen image. In a buffered window system, the images of the translucent window and the window under the translucent window are generated separately; and the window system combines the images of the windows to display the translucent window and the window under it. In a non-buffered window system, the translucent window may generate the image of the translucent window on top of the other window using the image of the window under it. For example, the translucent window obtains the image of the window under it after the window under it draws on the frame buffer; then, the translucent window generates a combined image to update the corresponding portion of the screen.

Figure 18:
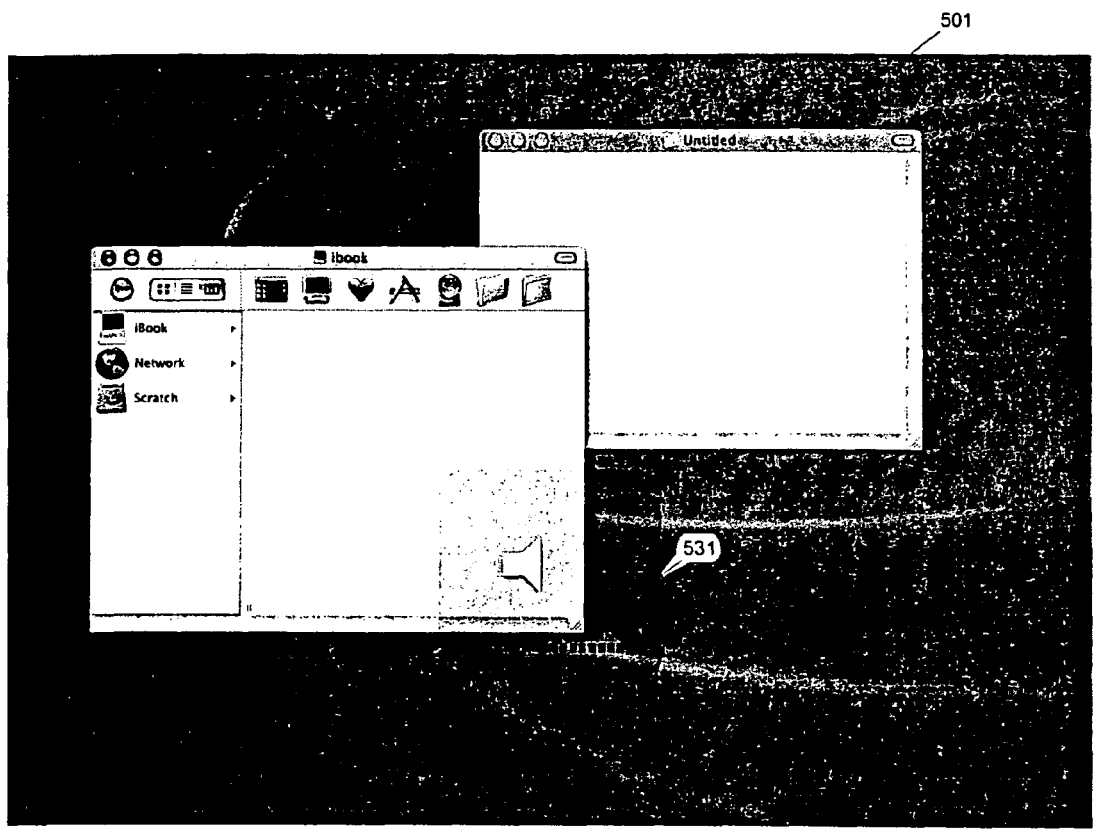
Figure 19:
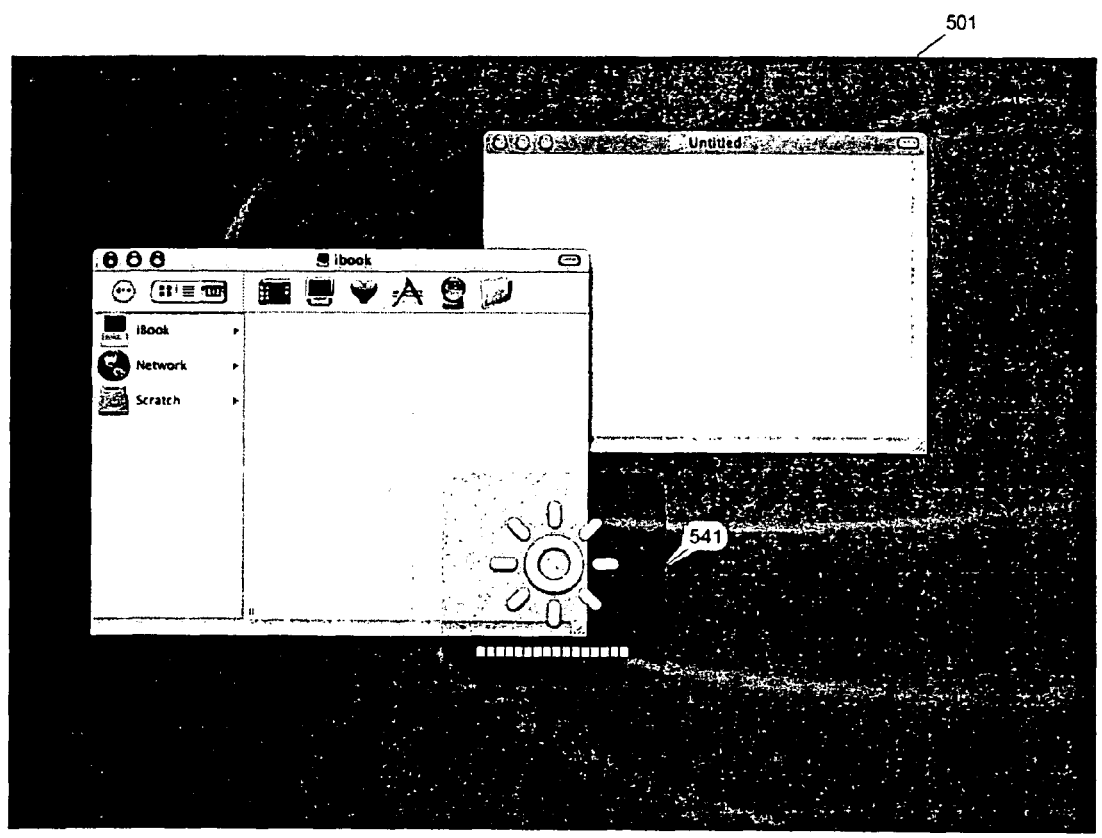
Figure 20:
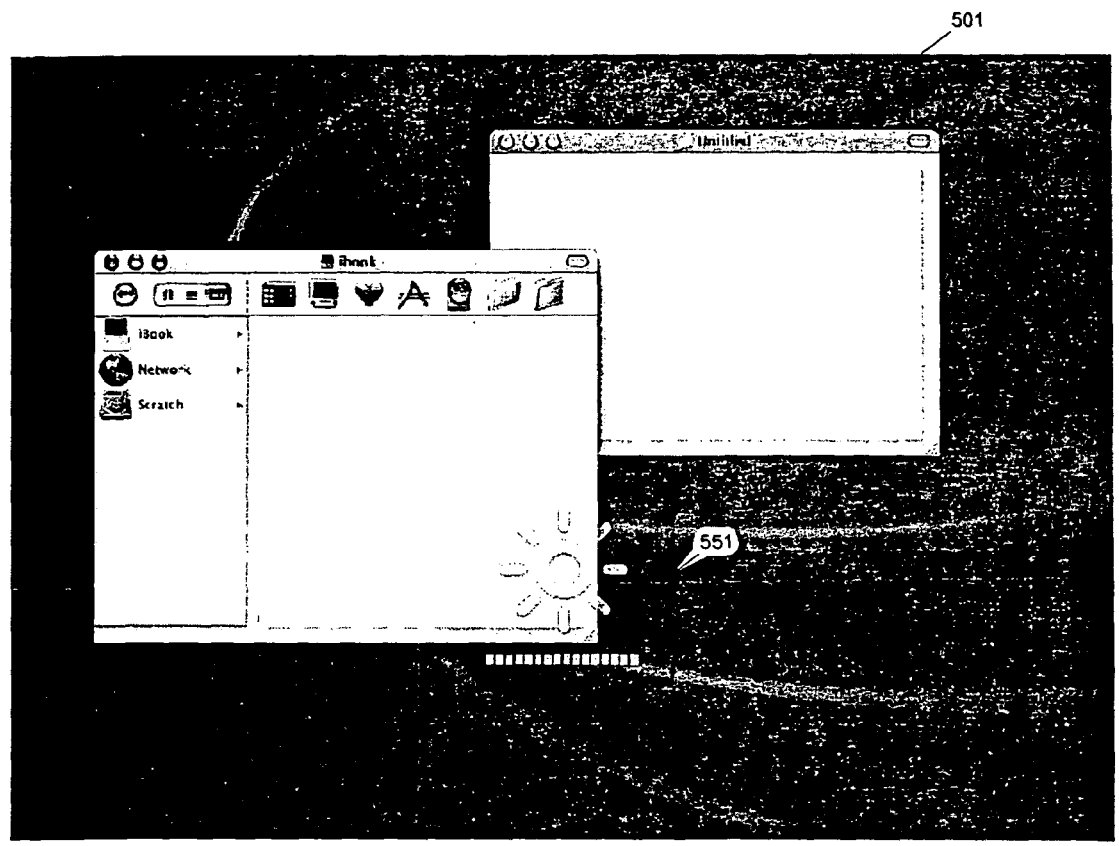
Figure 21:
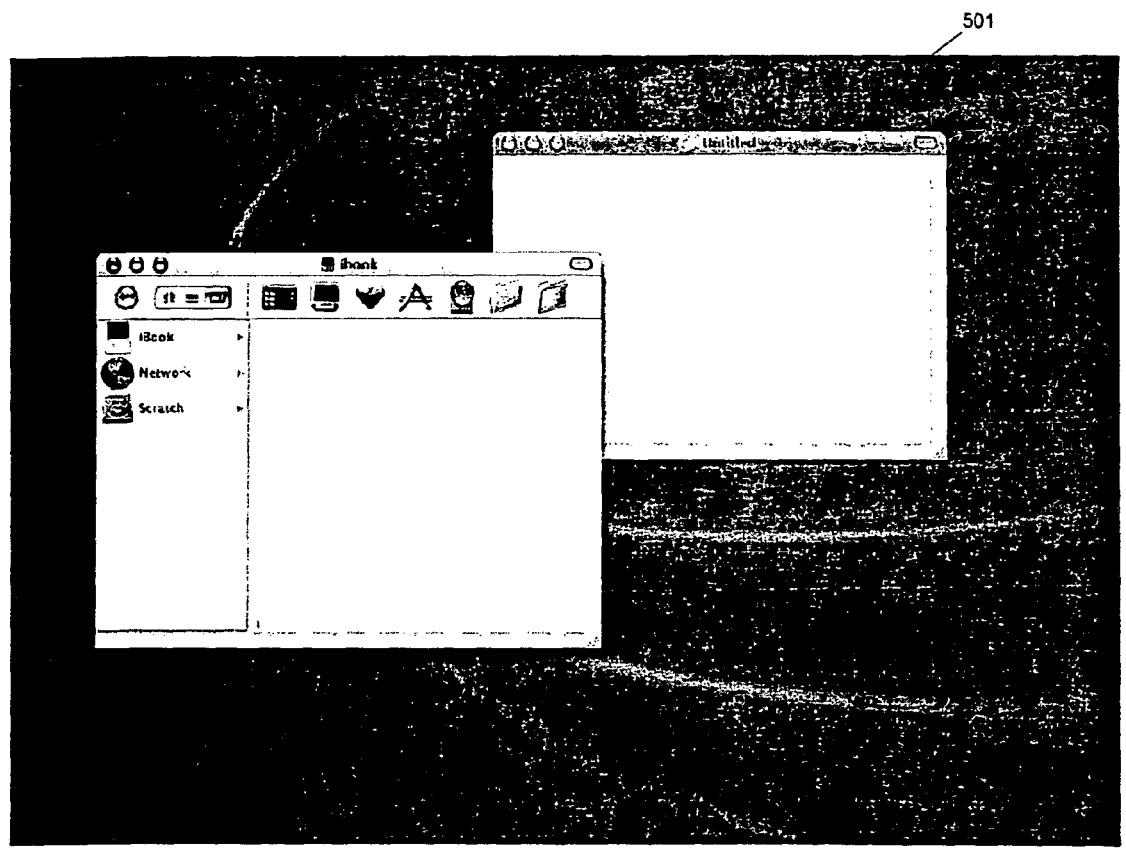

FIGS. 16-21 show example screen images of windows displayed according to one embodiment of the present invention. When a user starts to adjust the volume level (e.g., pressing on a function key for increasing or decreasing volume, or selecting an item from a system control menu with a cursor control device, such as a mouse or a touch pad), translucent volume window 511 appears on screen 501. Since window 511 is translucent, the portion of window 503 under window 511 is still visible. In one embodiment of the present invention, when window 511 is initially loaded, the background of volume window 511 has a high degree of transparency; and the content of window 511 has a low degree of transparency (or no transparency). Therefore, the user can easily see the content of window 511 when the user is supposed to focus on window 511. As the user provides input to adjust the volume level, window 511 remains in a state with a high degree of transparency for the background and a low degree of transparency for the content. For example, when the user decreases the volume level (e.g., pressing a function key, or an array key), the volume level is decreased as indicated by window 521 in FIG. 17. When the user further decreases the volume level to mute the speakers, window 531 changes an icon to indicate that the speakers are muted, as shown in FIG. 18. When the user starts to adjust the brightness of the monitor, translucent brightness window 541 appears, as shown in FIG. 19, while the volume window is hidden (or destroyed, or converted into the brightness window by redrawing the icon and the level bar). If the user stops providing input for the brightness window for an amount of time (e.g., a predetermined amount of time, a randomly selected amount of time, a time period determined according to a system condition or other criteria, a time period calculated on the fly, or a time period specified by a user) window 541 starts to fade away and be destroyed, as shown in FIGS. 20 and 21. In one embodiment of the present invention, when a translucent window starts to fade away, the degree of transparency of the content in the translucent window is increased to allow the user to see better the window under the translucent window, as illustrated by window 551 in FIG. 20. Thus, the degree of transparency of the window can be adjusted during the life cycle of the window to lead the focus point of the user. Further, a user may specify the degree of transparency of the window (e.g., as a preference parameter). The image of the window may fade out smoothly in an animation; or the image of the window may fade out in a number of discrete steps. The degree of translucency, the speed for fading out, the discrete levels of translucency for fading out, the time to expire, and/or other parameters for controlling the display of the window may be set by the user or adjusted by the system (or application software programs) automatically according to system conditions or other criteria. For example, the system (or application programs) may adjust the time to expire according to the number of translucent windows displayed concurrently on the screen; or the system (or an application program) may adjust the initial degree of translucency according to the color pattern at the location where the translucent window is displayed.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to display a system control interface comprising:
    displaying a graphical user interface;
    displaying a first system control interface over the graphical user interface;
    displaying a second system control interface over the first system control interface, wherein the first system control interface is hidden by the displayed second system control interface;
    starting a timer associated with the second system control interface; and
    removing the second system control interface when the timer expires,
    wherein displaying the first system control interface over the graphical interface occurs as a result of a user interacting with a user input device, wherein the input device is not directly related to manipulating a window on the graphical user interface.

2. The method of claim 1 wherein the first system control interface is adjusted to the second system control interface by interacting with the user input device.

3. The method of claim 1 wherein the first system control interface comprises a window with a plurality of bars.

4. The method of claim 1 wherein the first system control interface is removed by fading away the system control interface.

5. The method of claim 1 wherein the first system control interface controls volume level or monitor brightness.

6. A machine readable media containing executable computer program instructions which when executed by a digital processing system cause said system to perform a method to display a system control interface comprising:
    displaying a graphical user interface;
    displaying a first system control interface over the graphical user interface;
    starting a timer associated with the first system control interface;
    displaying a second system control interface over the first system control interface, wherein the first system control interface is hidden by the displayed second system control interface;
    starting a timer associated with the second system control interface;
    pausing the timer associated with the first system control interface when the second system control interface is displayed over the first system control interface; and
    removing the second system control interface when the timer associated with the second system control interface expires.

7. The machine readable media of claim 6 wherein displaying the first system control interface over the graphical interface occurs as a result of a user interacting with a user input device, wherein the input device is not directly related to manipulating a window on the graphical user interface.

8. The method of claim 6 wherein the first system control interface is adjusted to the second system control interface by interacting with a user input device.

9. The method of claim 6 wherein the first system control interface comprises a window with a plurality of bars.

10. The method of claim 6 wherein the first system control interface is removed by fading away the system control interface.

11. The method of claim 6 wherein the first system control interface controls volume level or monitor brightness.

* * * * *